United States Patent
Harmuth et al.

(10) Patent No.: US 10,859,193 B2
(45) Date of Patent: Dec. 8, 2020

(54) WASTE-GAS LINE FOR A BATTERY IN AN AIRCRAFT

(71) Applicant: Airbus Operations GmbH, Hamburg (DE)

(72) Inventors: Dirk Harmuth, Hamburg (DE); Jürgen Meinke, Hamburg (DE)

(73) Assignee: Airbus Operations GmbH

( * ) Notice: Subject to any disclaimer, the term of this patent is extended or adjusted under 35 U.S.C. 154(b) by 120 days.

(21) Appl. No.: 16/177,606

(22) Filed: Nov. 1, 2018

(65) Prior Publication Data

US 2019/0162340 A1 May 30, 2019

(30) Foreign Application Priority Data

Nov. 29, 2017 (DE) .......... 10 2017 128 251

(51) Int. Cl.

| H01M 2/10 | (2006.01) |
|---|---|
| F16L 25/02 | (2006.01) |
| H01M 2/12 | (2006.01) |
| F16L 21/00 | (2006.01) |
| F16L 25/12 | (2006.01) |
| F16L 57/04 | (2006.01) |
| B64D 45/02 | (2006.01) |

(Continued)

(52) U.S. Cl.
CPC .......... *F16L 25/025* (2013.01); *B64D 45/02* (2013.01); *F16L 21/002* (2013.01); *F16L 21/06* (2013.01); *F16L 25/12* (2013.01); *F16L 57/04* (2013.01); *H01M 2/1241* (2013.01); *B64D 2041/002* (2013.01); *F16L 2201/20* (2013.01); *H01M 2/364* (2013.01); *H01M 10/0525* (2013.01); *H01M 2200/20* (2013.01); *H01M 2220/20* (2013.01)

(58) Field of Classification Search
CPC .......... H01M 2/1094; H01M 10/345
See application file for complete search history.

(56) References Cited

U.S. PATENT DOCUMENTS

| 4,011,652 A | 3/1977 | Black |
|---|---|---|
| 8,947,846 B2 | 2/2015 | Courpet et al. |

(Continued)

FOREIGN PATENT DOCUMENTS

| DE | 27 01 340 A1 | 11/1977 |
|---|---|---|
| DE | 20 2016 001 797 U1 | 4/2016 |

(Continued)

*Primary Examiner* — Olatunji A Godo
(74) *Attorney, Agent, or Firm* — Lerner, David, Littenberg, Krumholz & Mentlik, LLP

(57) ABSTRACT

A waste-gas line has a first pipe section connectable to a battery and having an inlet end and a first flange, a separate second pipe section having a second outlet end and a second flange, and an inner sleeve and an outer sleeve, both of a non-conductive material. The inner sleeve is positioned on an outer side of the first flange and of the second flange. The outer sleeve surrounds the first flange, the second flange and the inner sleeve. The first and the second flanges are fastened to one another in such a way that at least the second pipe section is electrically insulated by the inner and the outer sleeves and, by the combination of inner and outer sleeves, is heat-resistant up to a temperature of at least 1100° C. and pressure-resistant up to a pressure of at least 8 bar, for a duration of at least 120 seconds.

12 Claims, 4 Drawing Sheets

(51) Int. Cl.
  *F16L 21/06*      (2006.01)
  *H01M 10/0525*    (2010.01)
  *B64D 41/00*      (2006.01)
  *H01M 2/36*       (2006.01)

(56) References Cited

U.S. PATENT DOCUMENTS

2007/0207007 A1* 9/2007 Orange .................. F16B 39/36
                                                    411/270
2011/0287295 A1* 11/2011 Lappe ................. H01M 2/0275
                                                    429/120
2015/0325827 A1* 11/2015 Dittmar ............... H01M 2/1252
                                                    137/15.01
2017/0271636 A1   9/2017 Rohrbach et al.

FOREIGN PATENT DOCUMENTS

EP        2 672 156 A1   12/2013
WO        2011/007100 A2  1/2011

* cited by examiner

WASTE-GAS LINE FOR A BATTERY IN AN AIRCRAFT

FIELD OF THE INVENTION

The present invention relates to a waste-gas line, and to an aircraft having a waste-gas line of said type.

BACKGROUND OF THE INVENTION

Electrification is playing an ever-increasing role in the aviation industry. It is important here that batteries satisfy the safety requirements for problem-free use in an aircraft.

In this context, it is desirable inter alia for the waste-gas line of a battery to be designed such that, even in the case of a defective or destroyed battery, the surrounding systems of the aircraft are protected. In the event of a defect of a battery in the aircraft, waste-gas flows at high temperatures can arise, which must be reliably conducted out of the aircraft. For the integration of batteries of different types, in order to ensure the greatest possible safety, there are numerous relevant regulations, for example the EASA, FAR and others.

DE 20 2016 001 797 U1 discusses a transport device for lithium batteries in an aircraft, in particular in a freight compartment. The transport device has a container and a cover, wherein lithium batteries are arranged in the container, and the cover closes off the container during transport of the lithium batteries. Released electrolyte can be conducted outside the aircraft through a line.

BRIEF SUMMARY OF THE INVENTION

In arranging a line out of the aircraft to the outside, it should be noted that adequate safety against lightning strikes, which could lead to damage to the battery, be preferably ensured. Furthermore, the line preferably is designed such that temperature stability that is adequate in the context of the relevant regulations is achieved.

Aspects of the present invention may provide a device by means of which the battery is protected against external influences and systems in an area surrounding the battery are protected against escaping electrolyte.

According to a first aspect of the invention, a waste-gas line for a battery in an aircraft is proposed. The waste-gas line has a first pipe section, which is connectable to the battery and which has an inlet end and a first flange, and a separate second pipe section which has a second outlet end and a second flange, and also an inner sleeve and an outer sleeve. The inner sleeve and the outer sleeve are composed of a non-conductive material. The inner sleeve is positioned on an outer side of the first flange and of the second flange. The outer sleeve surrounds the first flange, the second flange and the inner sleeve. The first flange and the second flange are fastened to one another in such a way that at least the second pipe section is electrically insulated by the inner sleeve and the outer sleeve, and the combination of inner sleeve and outer sleeve is heat-resistant up to a temperature of at least 1100° C. and pressure-resistant up to a pressure of at least 8 bar, in each case for a duration of at least 120 seconds.

The waste-gas line refers to a line for transporting waste gas of a battery.

The first pipe section forms a part of the waste-gas line which, in the installed state, extends exclusively in the interior of the aircraft. The first flange is arranged at an end of the first pipe section averted from the battery. The first flange may be designed merely in the form of a pipe end. Optionally, the first flange may also have a collar or some other, in particular outwardly facing shape feature which leads to an improved seat of the inner sleeve and/or of the outer sleeve.

The first pipe section is preferably welded to an electrolyte outlet of the battery. Alternatively, the first pipe section may also be connected to the electrolyte outlet by means of a screw connection. In one example, the electrolyte outlet may be formed as a flange. A further flange is provided at a second end of the first pipe section, specifically an end facing towards the battery, in order to connect the first pipe section to the electrolyte outlet by means of a screw connection.

The second pipe section forms a further part of the waste-gas line which, in the installed state, likewise extends exclusively in the interior of the aircraft. The second flange is arranged at an end of the second pipe section facing towards the first flange. The second flange may likewise be designed merely in the form of a pipe end. Optionally, the second flange may also have a collar or some other, in particular outwardly facing shape feature which leads to an improved seat of the inner sleeve and/or of the outer sleeve.

The expression "flange" may also be referred to as "attachment end". The first and second flange each form the two pipe ends of the first and second pipe sections to be connected.

The expression "inner sleeve" refers to a preferably cylindrical body with a ring-shaped cross section. The inner diameter of the inner sleeve corresponds at least to the outer diameter of the two flanges, and is preferably slightly larger, in order for the inner sleeve to be pushed on over the first and the second flange. The length of the inner sleeve corresponds at least to the spacing between the two pipe ends, and is preferably longer, in order to permit a secure seat on the pipe ends.

The expression "outer sleeve" likewise preferably refers to a cylindrical body with a ring-shaped cross section. The inner diameter of the outer sleeve is larger than that of the inner sleeve, such that the outer sleeve can be mounted over the first pipe section and the second pipe section with inner sleeve situated thereon.

The axial direction refers to the direction along the waste-gas line. The radial direction refers to the direction perpendicular to the waste-gas line.

It has been identified that the inner sleeve in combination with an outer sleeve can realize a heat resistance of at least 1100° C. over the prescribed duration even if the inner sleeve and the outer sleeve individually withstand only relatively low-temperature. For example, the inner sleeve or the outer sleeve may be heat-resistant only up to a temperature of approximately 200° C. The skillful arrangement of two mutually separate sleeves, which may optionally enclose an intermediate space with one another, however leads to a considerably improved heat resistance. In this way, with the proposed arrangement, the heat resistance can be significantly increased without the use of a conductive material.

Likewise, the pressure resistance over the prescribed duration can be increased by means of the combination of the inner sleeve with an outer sleeve. Through the use of a non-conductive material, the waste-gas line is furthermore electrically insulated, and is inter alia protected against a lightning strike. In this way, the introduction of an external electrical current into the battery is avoided. Here, at least the second pipe section is electrically insulated from the first pipe section, such that a current induced by a lightning strike affecting the second pipe section cannot pass to the first pipe section and thus to the battery and then damage the latter.

In one advantageous embodiment, the waste-gas line has two spacers which are attached, preferably welded, to the first flange and to the second flange respectively in order to space the inner sleeve and the outer sleeve apart from one another in the radial direction. A spacer is likewise realized as a sleeve-shaped component which encircles the respective flange with a spacing. The outer diameter of the inner sleeve is preferably dimensioned such that the outer side of the inner sleeve bears against an inner side of the respective spacer. In this way, the inner sleeve is held in the radial direction by the spacer. The inner sleeve is consequently situated between the respective flange and the spacer arranged thereon. The inner sleeve and the outer sleeve are spatially separated from one another by the spacers. The spacers may furthermore fix the inner sleeve in the axial direction.

It is ensured in this way that the first pipe section and the second pipe section are protected from the outside, and at the connection points of the first and second pipe section, over the full circumference. The first flange and the second flange are spatially separated from one another by the spacing in the axial direction of the waste-gas line, such that no electrical current can be transmitted from the second pipe section to the first pipe section.

In a further advantageous embodiment, the spacers are designed such that the inner sleeve extends at least along a spacing predefined by the spacer. In combination with the outer sleeve situated over said inner sleeve in the radial direction, the waste-gas line is, at the connection point of the first and second flange, heat-resistant up to a temperature of at least 1100° C. and pressure-resistant up to a pressure of at least 8 bar. Outside the connection point, higher values with regard to pressure and temperature resistance are realized.

The spacers preferably have an L-shaped profile. The ends of the relatively short limb of the L shape are in each case welded to the outer side of the corresponding pipe section or to the respective flange. The relatively long limb of the spacer may be straight or curved.

The length of the inner sleeve is for example configured such that the inner sleeve is held in the axial direction by the inner side of the relatively short limb of each spacer. It is thus ensured that the inner sleeve is firmly seated in the axial direction.

In another embodiment, it would be conceivable for the inner sleeve to directly provide the spacing between the first flange and the second flange. In this example, the inner sleeve has, in a central part, a radial projection with a certain width along the axial direction, in order to produce an insulated spacing between the first flange and second flange. The radial projection has a radial extent which corresponds at least to the wall thickness of the first and second flange.

The spacer preferably likewise has an additional heat-resistant material at least over a section. In this way, the heat resistance can be further increased, that is to say above the temperature range of at least 1100° C. The spacer may for example be realized with a heat-resistant material in a central region. The spacer may furthermore be composed entirely of a heat-resistant material. Furthermore, the waste-gas line may be supplemented by a ring which is composed of a heat-resistant material and which lies on the inner sleeve between the two spacers.

In one preferred embodiment, the outer sleeve is dimensioned so as to surround the spacers, the first flange and the second flange. The non-conductive material is preferably elastic, such that it can be fitted over the spacers.

The non-conductive material is preferably silicone. It has been found that silicone best satisfies the criteria with regard to heat resistance, pressure resistance and electrical conductivity.

In one embodiment, the outer sleeve is fastened in positively locking and/or non-positively locking fashion to the first and second flange in order to thus connect the first pipe section and the second pipe section. In a further example, the outer sleeve is fastened to the first and second pipe section, that is to say the outer sleeve is dimensioned such that the outer sleeve is arranged over the first and second flange in the axial direction of the waste-gas line. The length of the outer sleeve in the axial direction may be longer than that of the inner sleeve.

Preferably, the outer sleeve is connected in positively locking fashion to the first and second flange in order to connect the first pipe section and the second pipe section to one another.

In a further embodiment, the waste-gas line furthermore has at least two pipe clamps for the purposes of fastening the outer sleeve to the first pipe section and to the second pipe section. Here, in each case one pipe clamp is arranged on the first flange and on the second flange in order to fasten the outer sleeve to the first flange and to the second flange. In one example, in each case two pipe clamps are fastened to the first flange and to the second flange. In another example, the outer sleeve is adhesively bonded to the first and second flange. It is likewise conceivable for the outer sleeve to be dimensioned to be longer, and for the outer sleeve to be arranged in each case on the first pipe section and on the second pipe section in order to fasten the outer sleeve in each case to the first pipe section and to the second pipe section. This variant may self-evidently be used with the use of the spacers. The outer sleeve then lies flush on the spacers.

According to a second aspect of the invention, an aircraft is proposed. The aircraft has a fuselage with a fuselage skin and with a rupture disk arranged therein. The aircraft furthermore has a battery and a waste-gas line. An inlet end of a first pipe section of the waste-gas line is connected to the battery, and the outlet end is connected to an inner side of the rupture disk. The rupture disk is designed to rupture in the presence of a predetermined pressure within the waste-gas line in order to discharge the waste gases from the aircraft.

The rupture disk ruptures at the latest at a pressure of 2.5 bar. In this way, the waste gas of the battery can, above a certain pressure, escape from the aircraft. This is generally the case when the battery is damaged. The waste-gas line according to the invention is designed to conduct the waste-gas flow, which arises in this situation and which is at a relatively high pressure, out of the aircraft such that, here, the aircraft and the surrounding systems are not adversely affected in terms of their function.

In one embodiment, the battery is a lithium-ion battery.

It is pointed out that the features of the exemplary embodiments of the system also apply to embodiments of the cabin segment and of the aircraft, and vice versa. Furthermore, it is also possible to freely combine with one another those features for which this is not explicitly mentioned.

These and further aspects of the invention will become clear with reference to the following statements.

BRIEF DESCRIPTION OF THE DRAWINGS

Exemplary embodiments of the invention will be described below with reference to the figures. In the figures.

DETAILED DESCRIPTION

Figure 1:
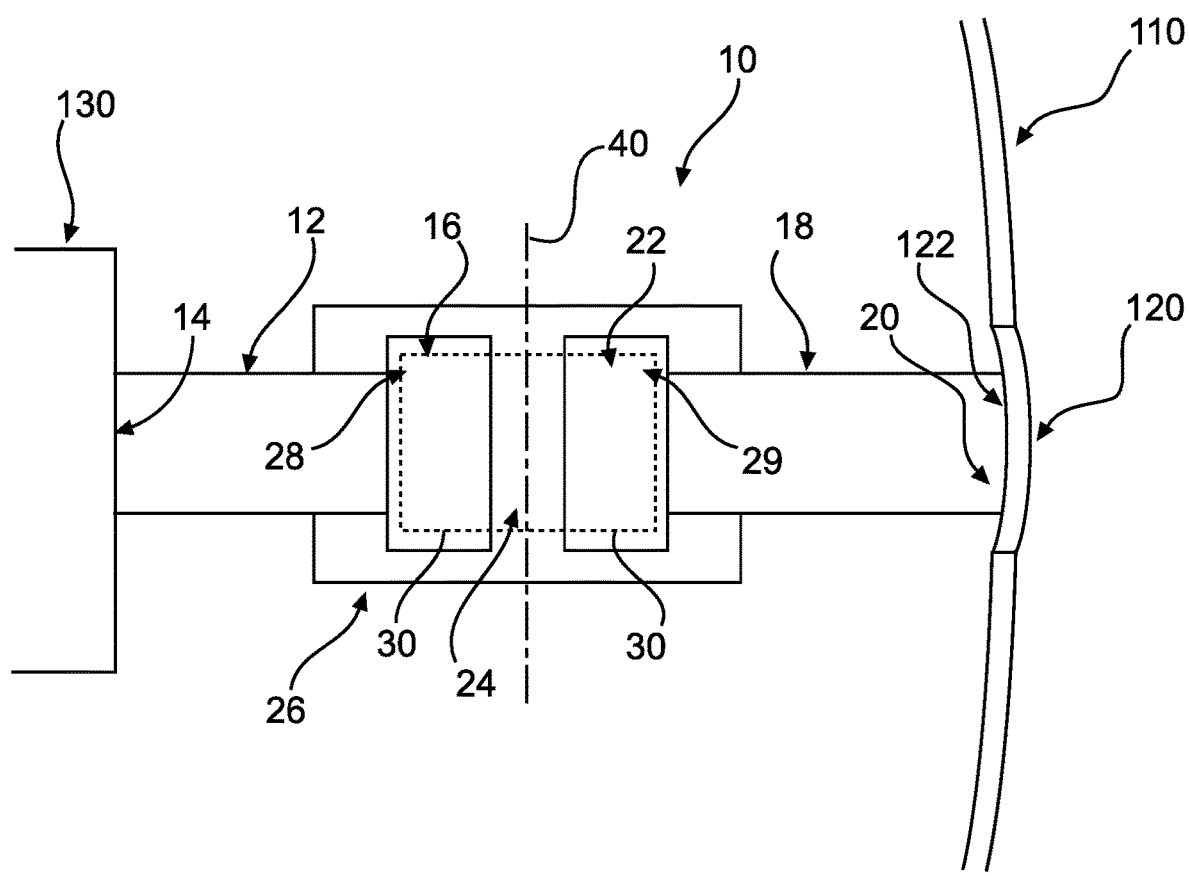
FIG. 1 shows a schematic cross-sectional illustration of the waste-gas line and an embodiment of a battery of said type as a connection between a battery and a fuselage skin.

FIG. 1 shows a waste-gas line 10 for a battery 130 in an aircraft 100. The waste-gas line 10 has a first pipe section 12, which is connectable to the battery 130 and which has an inlet end 14 and a first flange 16, and a separate second pipe section 18 which has a second outlet end 20 and a second flange 22, and also an inner sleeve 24 and an outer sleeve 26. The inner sleeve 24 and the outer sleeve 26 are composed of a non-conductive material. The inner sleeve 24 is positioned on an outer side 28, 29 of the first flange 16 and of the second flange 22. The outer sleeve 26 surrounds the first flange 16, the second flange 22 and the inner sleeve 24. The first flange 16 and the second flange 22 are fastened to one another in such a way that at least the second pipe section 18 is electrically insulated by the inner sleeve 24 and the outer sleeve 26 and is at the same time heat-resistant up to a temperature of at least 1100° C. and pressure-resistant up to a pressure of at least 8 bar, in each case for a duration of at least 120 seconds.

Furthermore, FIG. 1 shows a battery 130, to which the inlet end 14 of the first pipe section 12 is fastened, and an exemplary section of a fuselage skin 110, which has a rupture disk 120, to which the outlet end 20 of the second pipe section 18 is connected.

The inner sleeve 24 is arranged on the first pipe section 12 and on the second pipe section 18 (see dashed line). Here, the inner sleeve 24 bridges the spacing between the first and second flange 16, 22. It would be possible for stops (not shown) to be provided on the outer side of the first and of the second pipe section 12, 18 in order to position the inner sleeve at a desired position. By means of said stops, it is ensured that the inner sleeve 24 bridges or fills the spacing between first and second flange 16, 22. The outer sleeve 26 serves as a further connection between first and second pipe section 12, 18.

Figure 2:
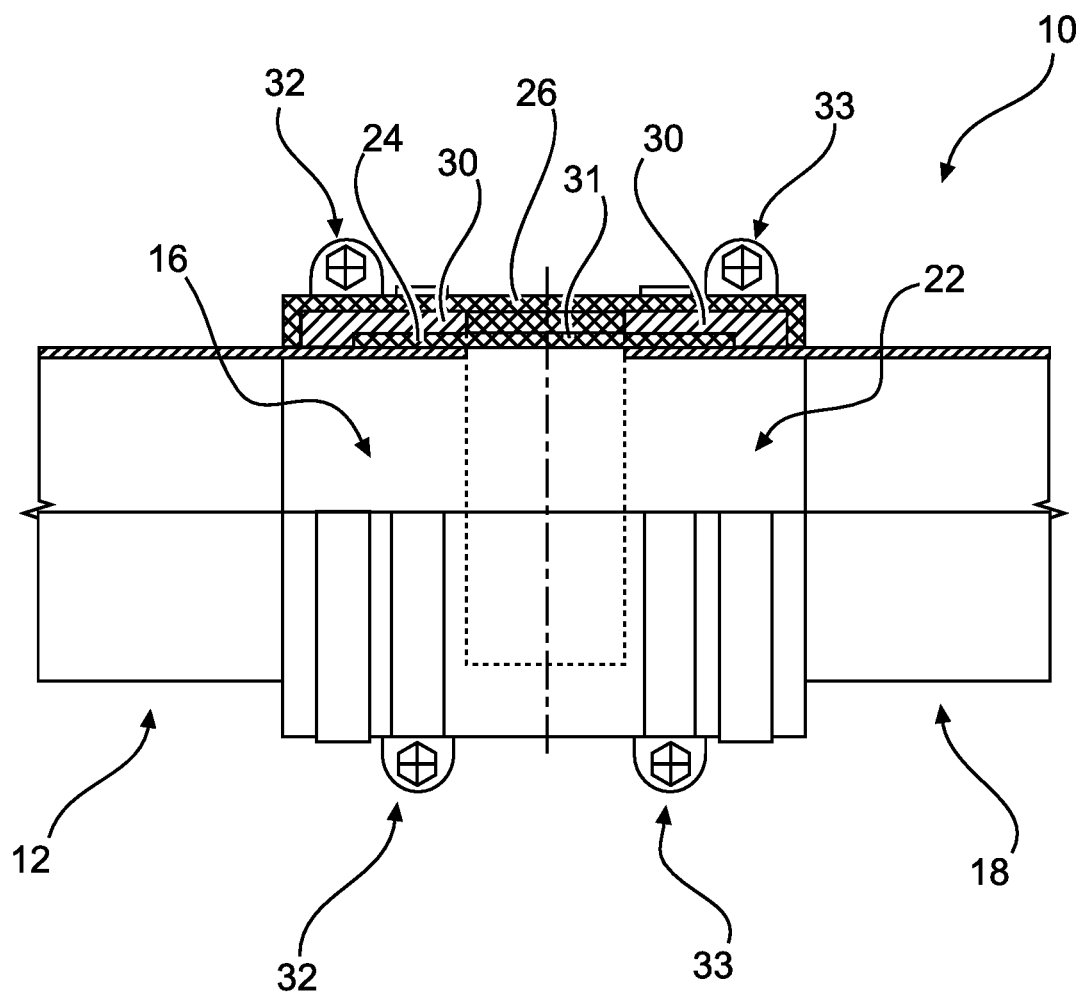
FIG. 2 shows a further schematic cross-sectional illustration of the waste-gas line with a spacer according to an embodiment of the invention.

FIG. 2 shows a further exemplary embodiment of the waste-gas line 10 with two spacers 30. The spacers 30 are welded to the first flange 16 and to the second flange 22 respectively, in order to space the inner sleeve 24 and the outer sleeve 26 on the two flanges 16 and 22 apart from one another in the radial direction. A spacer 30 has preferably one or more L-shaped holders. The relatively short limb is in each case welded to the outer side of the first flange 16 and of the second flange 22 respectively. The relatively long limb of the spacer is straight or slightly curved.

In the example shown here, the spacers 30 are designed such that the inner sleeve 24 bridges a spacing, predefined by the spacers 30, between the first and second flange 16, 22.

Furthermore, the spacers likewise have an additional heat-resistant material 31 at least over a section 31. In the embodiment shown here, the heat-resistant material 31 extends such that the heat-resistant material 31 additionally covers the spacing between the flanges 16 and 22. This may consequently be a ring composed of a heat-resistant material, which lies on the inner sleeve 24.

In another embodiment which is not shown, the spacers 30 are composed of a heat-resistant material. In another embodiment which is not shown, the spacers are not manufactured from a heat-resistant material.

In the example shown here, the outer sleeve 26 is dimensioned such that the first flange 16, the second flange 22 and the spacers 30 are surrounded. The non-conductive material is for example silicone.

In one example, the outer sleeve 26 is connected in positively locking and/or non-positively locking fashion to the first and second flange 16, 22 in order to thus connect the first pipe section 12 and the second pipe section 18. In the example shown here, the waste-gas line 10 furthermore has at least two pipe clamps 32, 33 for the purposes of fastening the outer sleeve 26 to the first pipe section 12 and to the second pipe section 18 or to the spacers 30 situated thereon. In the example shown, the outer sleeve 26 is fixed by means of two pipe clamps 32.

Figure 3:
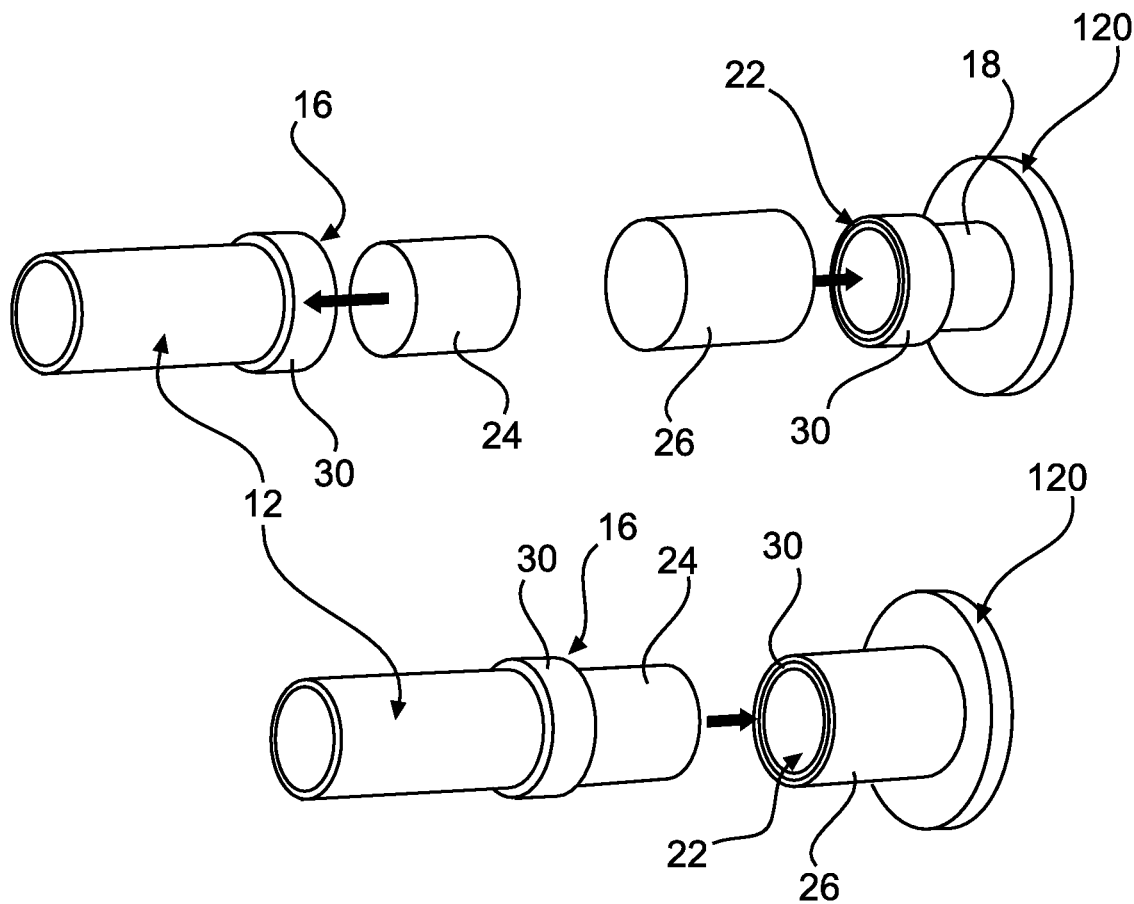
FIG. 3 shows a schematic perspective view of the waste-gas line.

FIG. 3 shows the waste-gas line 10 in a perspective view. It is intended here to illustrate the installation sequence of the inner sleeve 24 and of the outer sleeve 26 into or onto the first and the second pipe section 12, 18. The inner sleeve 24 is partially mounted onto the first flange 16, such that a part still projects beyond the first flange 16. The inner sleeve is then situated between the first flange 16 and the spacer 30 situated thereon.

That part of the inner sleeve 24 which is mounted onto the first flange 16 is preferably of similar length to that part of the inner sleeve 24 which projects beyond the first flange 16. Subsequently, the outer sleeve 26 is mounted onto the second pipe section 18 directly onto the spacer 30 and is pushed onto the spacer 30 such that the outer sleeve 26 no longer projects over the second flange 18. In a subsequent step, the first flange 16 with the inner sleeve 24 is arranged on the second flange 18 such that the inner sleeve 24 is inserted into a ring-shaped gap between the second flange 18 and the spacer 30 situated thereon. In a further step which is not shown in detail, the outer sleeve 26 is finally pushed over the arrangement composed of spacer 30 and inner sleeve 24. Here, the outer sleeve 26 is, in a manner shown in FIG. 1 or FIG. 2, arranged on the first and the second pipe section 12, 18 symmetrically relative to a centreline 40. The fastening of this arrangement is then performed as a final step.

Figure 4:
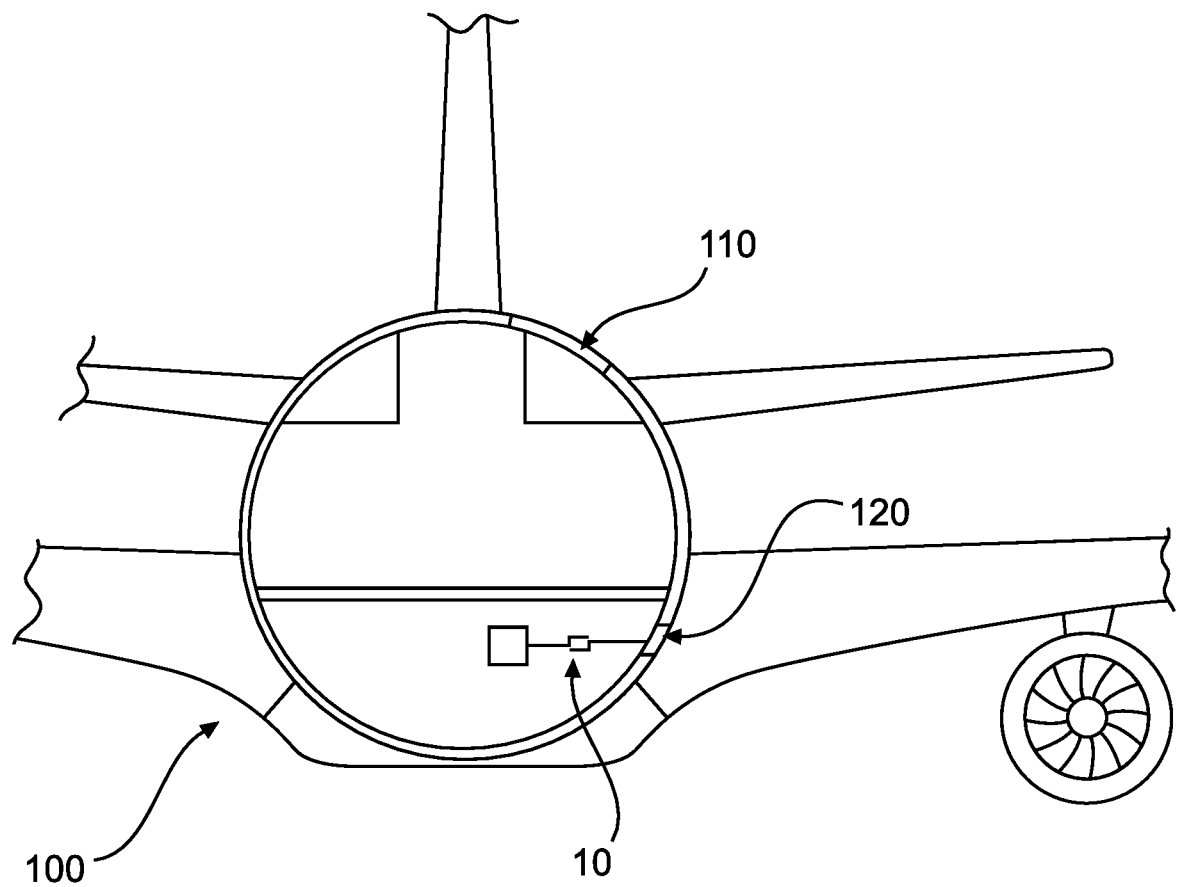
FIG. 4 shows a schematic view of an aircraft with a waste-gas line according to the invention.

FIG. 4 shows an aircraft 100. The aircraft 100 has a fuselage 110 with a fuselage skin and with a rupture disk 120 arranged therein. The aircraft 100 furthermore has a battery 130 and a waste-gas line 10. An inlet end 14 (see FIG. 1) of a first pipe section 12 (see FIG. 1) of the waste-gas line 10 is connected to the battery 130, and the outlet end 20 (see FIG. 1) is connected to an inner side of the rupture disk 122 (see FIG. 1). The rupture disk 120 is designed to rupture in the presence of a predetermined pressure within the waste-gas line in order to discharge the waste gases from the aircraft.

The position of the rupture disk 120 in the fuselage 110 is dependent on the position of the battery 130 in the aircraft. That side of the second pipe section 18 which faces towards the rupture disk 120 is welded to an inner side of the rupture disk 120.

The above-described exemplary embodiments may be combined in a variety of ways.

It is additionally pointed out that "comprising" does not rule out other elements or steps, and "a" or "an" do not rule out a multiplicity. It is also pointed out that features that have been described with reference to one of the above exemplary embodiments may also be used in combination with other features or steps of other exemplary embodiments described above. Reference signs in the claims are not to be regarded as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A waste-gas line for a battery in an aircraft, comprising:
a first pipe section connectable to the battery and having an inlet end at a first end and a first flange at a second end opposite the first end;
a separate second pipe section having a second outlet end at a first end and a second flange at a second end opposite the first end;
an inner sleeve and an outer sleeve, wherein the inner sleeve and the outer sleeve are composed of a non-conductive material,
wherein the inner sleeve is positioned on an outer side of the first flange and of the second flange,
wherein the outer sleeve surrounds the first flange, the second flange and the inner sleeve, and
wherein the first flange and the second flange are fastened to one another in such a way that at least the second pipe section is electrically insulated by the inner sleeve and the outer sleeve, and the combination of inner sleeve and outer sleeve is heat-resistant up to a temperature of at least 1100° C. and pressure-resistant up to a pressure of at least 8 bar, in each case for a duration of at least 120 seconds.

2. The waste-gas line according to claim 1, wherein in each case one spacer is attached to the first flange and to the second flange in order to space the inner sleeve and the outer sleeve apart from one another in a radial direction.

3. The waste-gas line according to claim 2, wherein the spacers attached to the first flange and the second flange are dimensioned such that the inner sleeve fills a spacing predefined by the spacers.

4. The waste-gas line according to claim 2, wherein the spacers attached to the first flange and the second flange have, at least over a spacing defined by the spacers, an additional heat-resistant material.

5. The waste-gas line according to claim 2, wherein the outer sleeve is configured to surround the first flange, the second flange and the spacers.

6. The waste-gas line according to claim 1, wherein the non-conductive material is silicone.

7. The waste-gas line according to claim 1, wherein the outer sleeve is connected in positively locking and/or non-positively locking fashion to the first flange and the second flange in order to thus connect the first pipe section and the second pipe section.

8. The waste-gas line according to claim 1, wherein the waste-gas line further comprises at least two pipe clamps for the purposes of fastening the outer sleeve to the first pipe section and to the second pipe section.

9. An aircraft, comprising:
a fuselage with a fuselage skin and with a rupture disk arranged therein;
a battery; and
a waste-gas line according to claim 1,
wherein the inlet end is connected to the battery, and the outlet end is connected to an inner side of the rupture disk, and
wherein the rupture disk is configured to rupture in the presence of a predetermined pressure within the waste-gas line in order to discharge the waste gases from the aircraft.

10. The aircraft according to claim 9, wherein the battery is a lithium-ion battery.

11. The waste-gas line according to claim 1, wherein the first pipe section is connectable to the battery at the inlet end.

12. The waste-gas line according to claim 1, wherein the first pipe section is connectable to an electrolyte outlet of the battery.

* * * * *